No. 876,241. PATENTED JAN. 7, 1908.
W. SCHREIBER.
UNDERGROUND SYSTEM OF LAYING ELECTRICAL CONDUCTORS.
APPLICATION FILED MAR. 28, 1907.
7 SHEETS—SHEET 1.
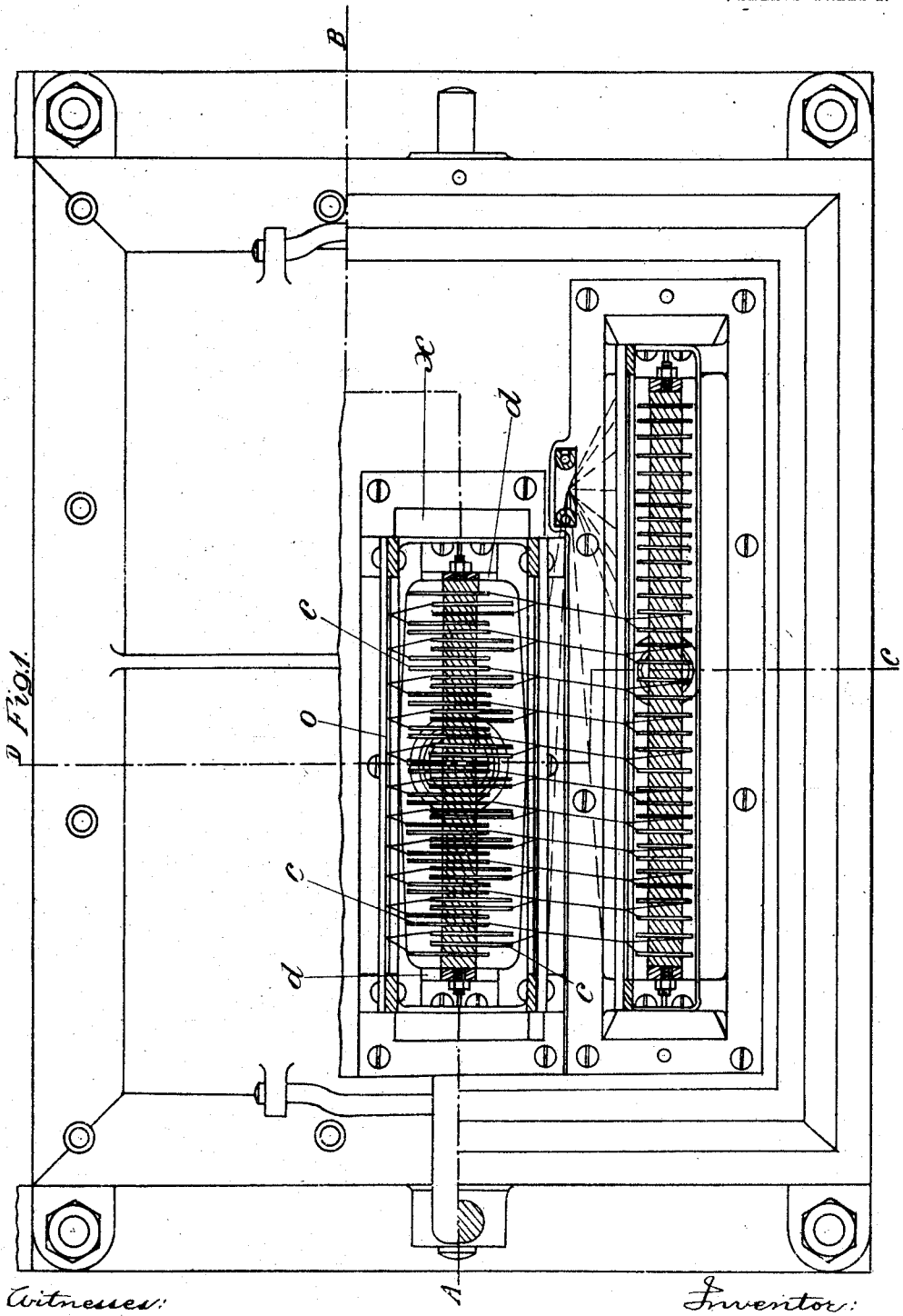

No. 876,241. PATENTED JAN. 7, 1908.
W. SCHREIBER.
UNDERGROUND SYSTEM OF LAYING ELECTRICAL CONDUCTORS.
APPLICATION FILED MAR. 28, 1907.
7 SHEETS—SHEET 2.
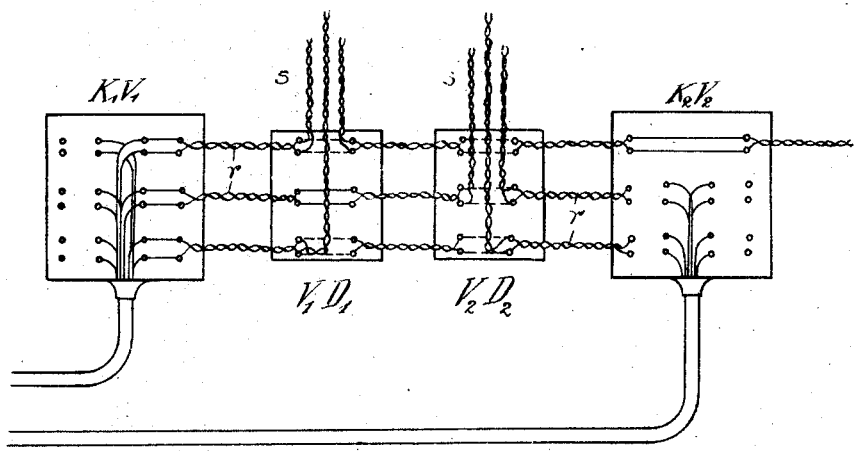

No. 876,241. PATENTED JAN. 7, 1908.
W. SCHREIBER.
UNDERGROUND SYSTEM OF LAYING ELECTRICAL CONDUCTORS.
APPLICATION FILED MAR. 28, 1907.
7 SHEETS—SHEET 3.
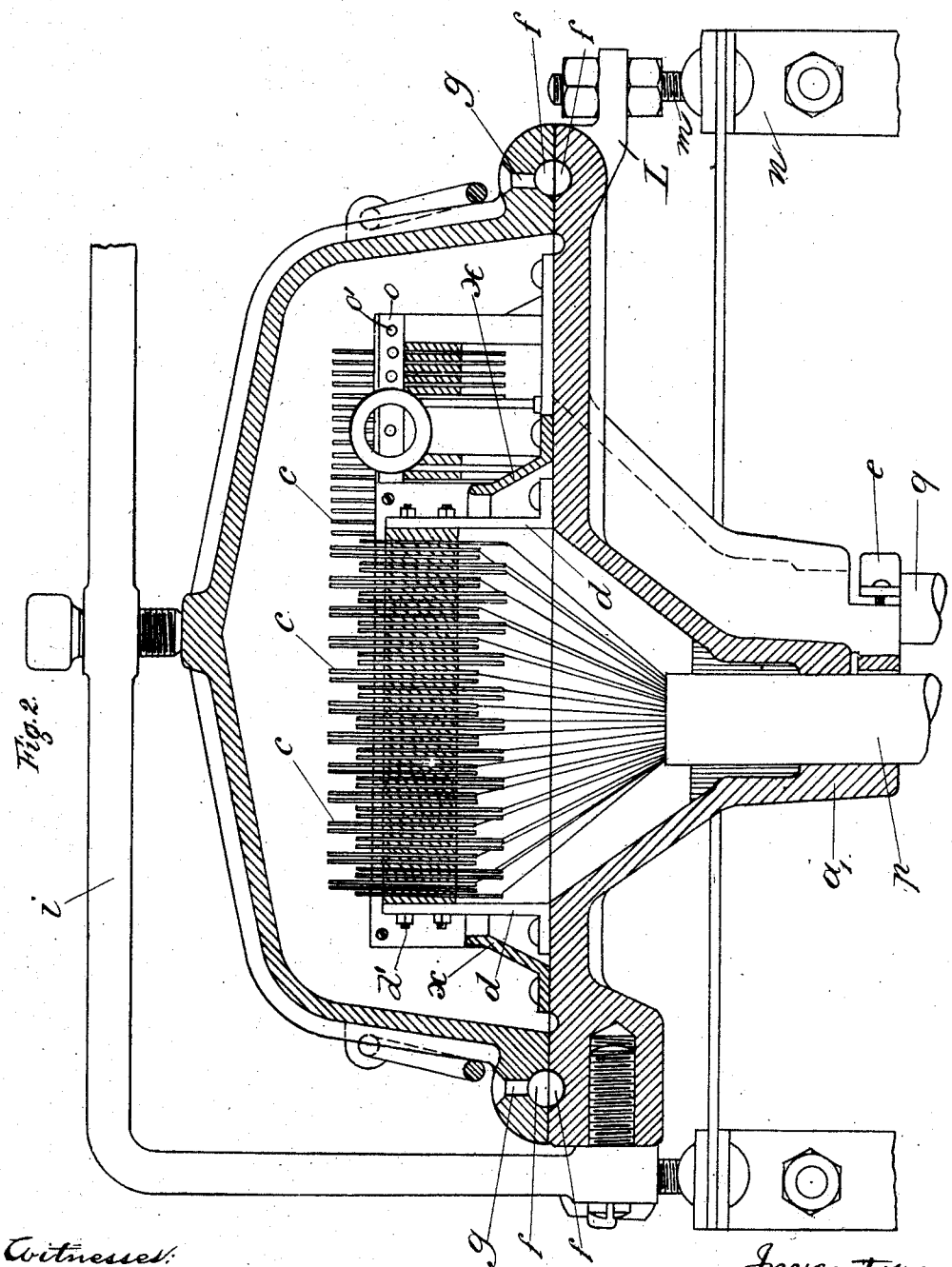

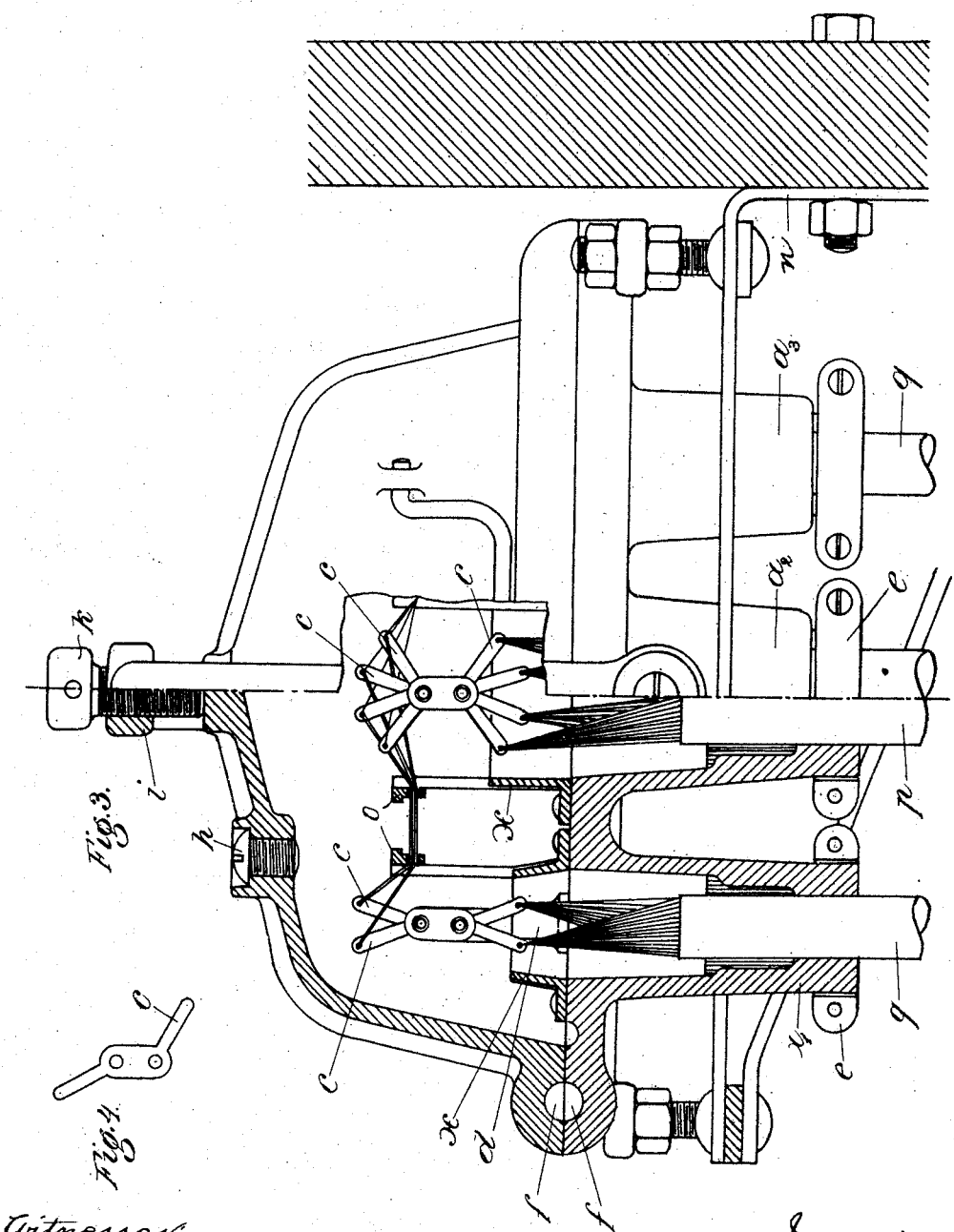

No. 876,241. PATENTED JAN. 7, 1908.
W. SCHREIBER.
UNDERGROUND SYSTEM OF LAYING ELECTRICAL CONDUCTORS.
APPLICATION FILED MAR. 28, 1907.
7 SHEETS—SHEET 5.
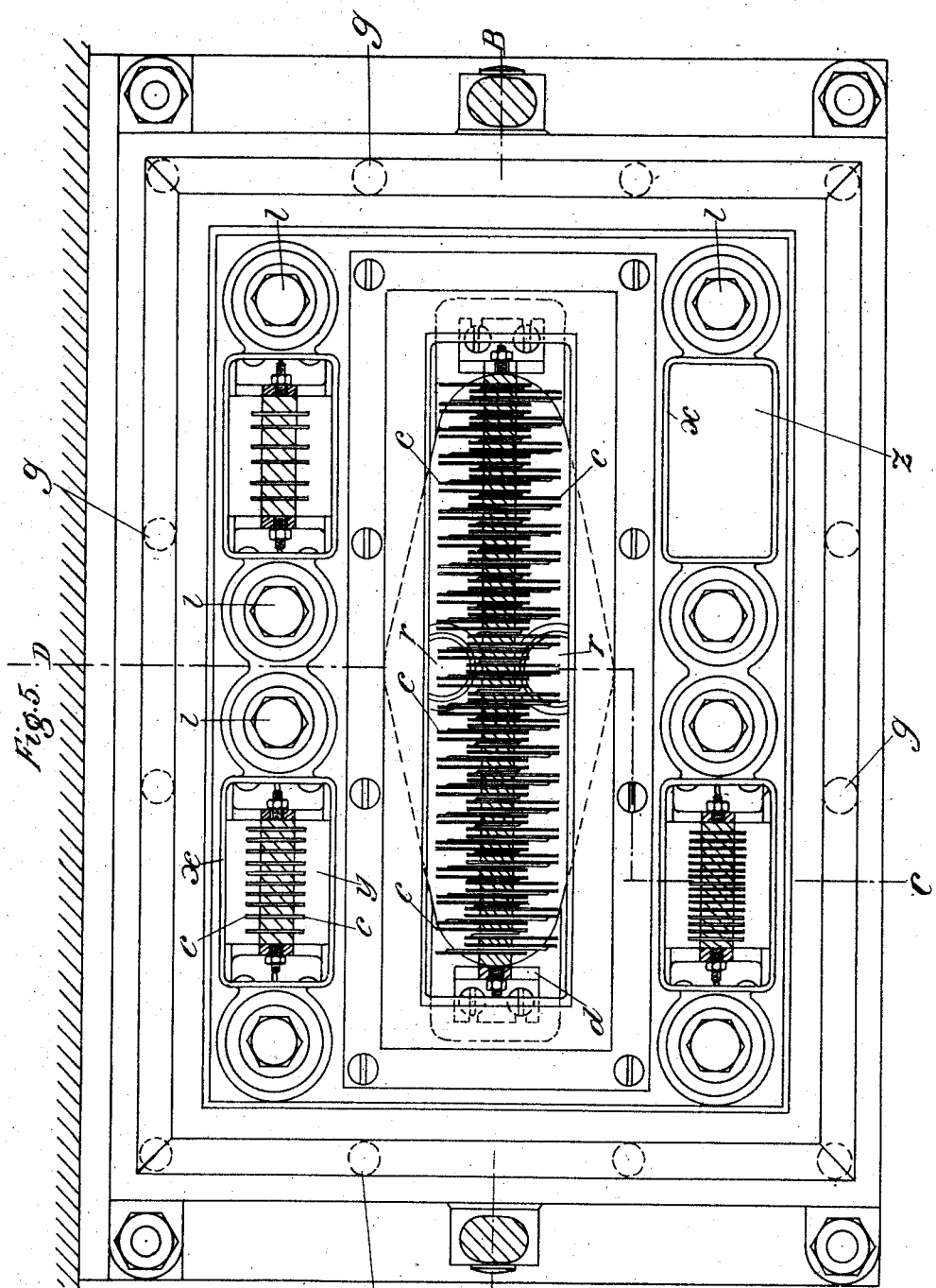

No. 876,241. PATENTED JAN. 7, 1908.
W. SCHREIBER.
UNDERGROUND SYSTEM OF LAYING ELECTRICAL CONDUCTORS.
APPLICATION FILED MAR. 28, 1907.
7 SHEETS—SHEET 6.
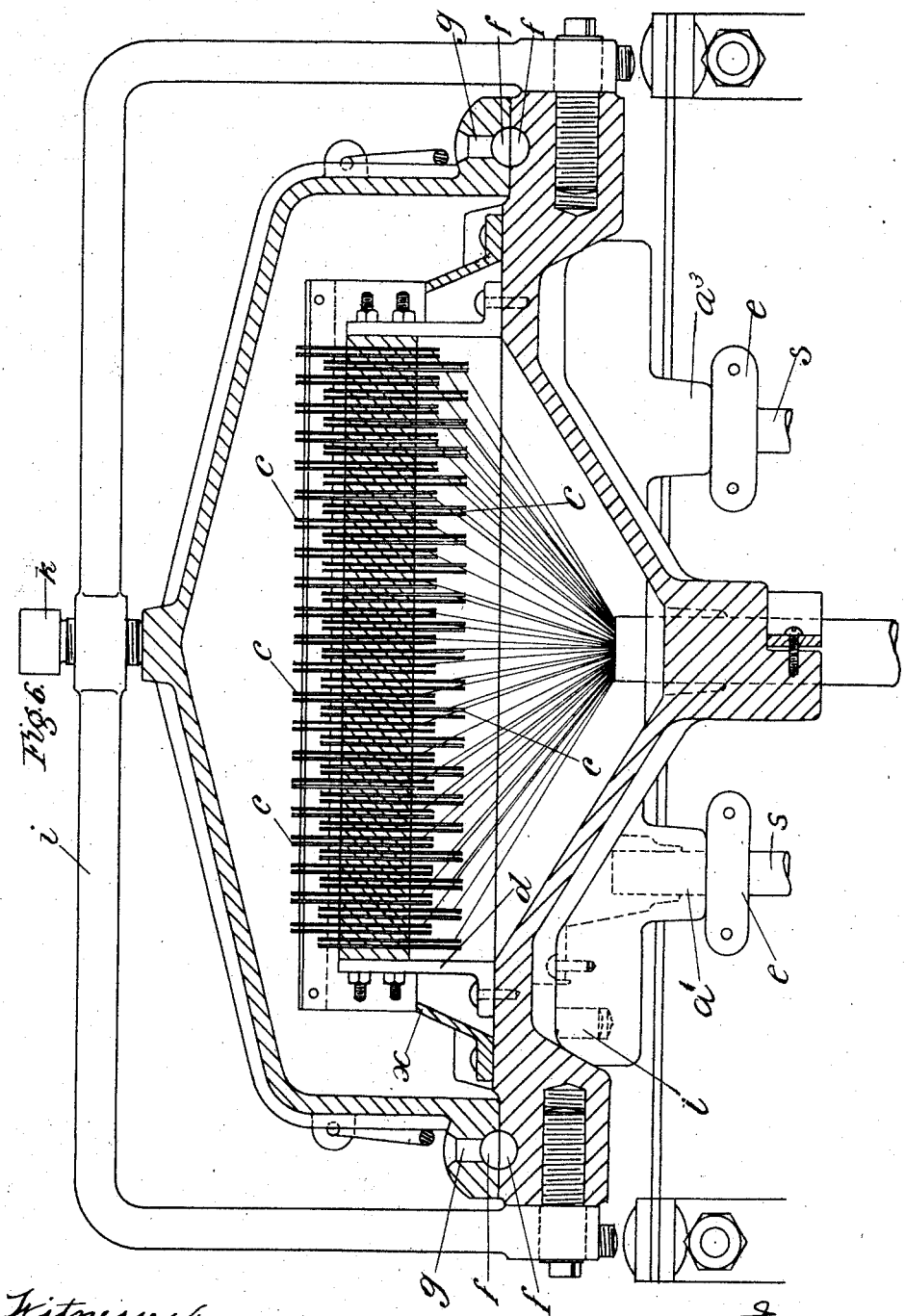

No. 876,241. PATENTED JAN. 7, 1908.
W. SCHREIBER.
UNDERGROUND SYSTEM OF LAYING ELECTRICAL CONDUCTORS.
APPLICATION FILED MAR. 28, 1907.
7 SHEETS—SHEET 7.
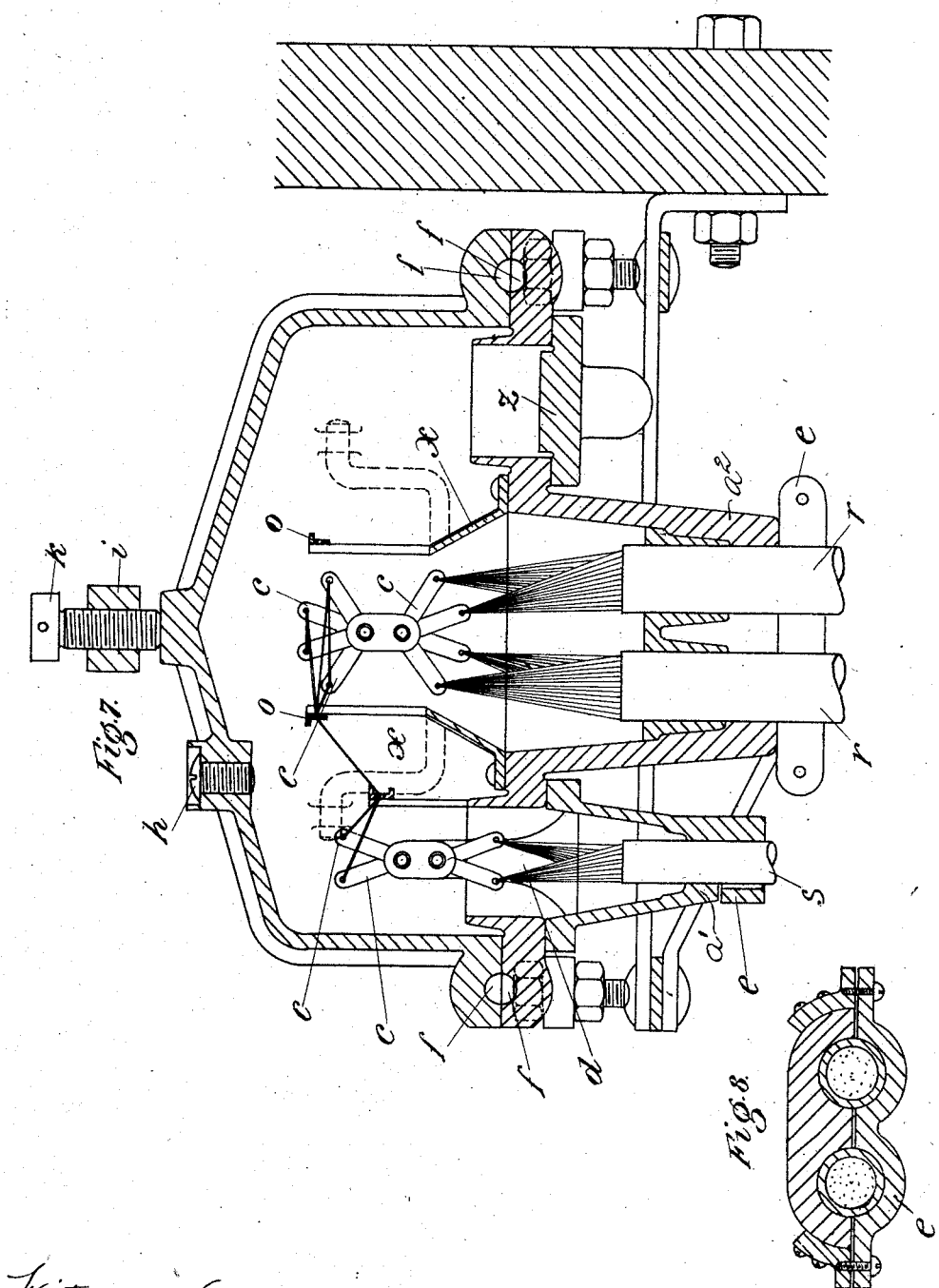

UNITED STATES PATENT OFFICE.

WILHELM SCHREIBER, OF MUNICH, GERMANY.

UNDERGROUND SYSTEM OF LAYING ELECTRICAL CONDUCTORS.

No. 876,241.　　　　Specification of Letters Patent.　　　　Patented Jan. 7, 1908.

Application filed March 28, 1907. Serial No. 365,119.

*To all whom it may concern:*

Be it known that I, WILHELM SCHREIBER, a citizen of Germany, residing at Munich, Bavaria, Germany, have invented certain new and useful Improvements in Underground Systems of Laying Electrical Conductors; and I do hereby declare the following to be a full, clear, and exact description of my invention, such as will enable others skilled in the art to which it appertains to make and use the same.

My invention relates to the arrangement of the conduits or cables, and the construction of the junction-boxes and wire-distributing devices for connecting the conductors in an underground system and more especially to a district telephone system.

The distribution of the conductors for the transmission of the electrical energy or the transmission of telephonic signals and currents from central stations to a number of diverse localities is effected, in my present system, by placing cable-division junction-boxes at the ends of the districts or blocks, which are connected by means of primary cables with the central station or telephone exchange. These cable division junction-boxes are provided with terminal connections for each of the conductors of the primary cables, and in addition thereto, with a plurality of connections for each conductor of the secondary cables which are laid in front of the houses of a block or district and connect the division junction-boxes at each end thereof through intermediate cables which are connected by means of multiple connection boxes or house-distributing junction-boxes. These house-distributing junction-boxes may advantageously be placed in front of every second or third house, without regard to immediate necessity, so that at any time a house cable with the desired number of conductors may be connected to the distribution system.

Each of the house-distributing junction-boxes is provided with a plurality of terminal connections, usually twice the number, for each conductor of the multiple-conductor secondary cable. By thus arranging a plurality of connections for each conductor, I may connect a pair of conductors of the secondary cable directly with the conductors of a cable leading to the next junction-box; and I may connect two sets of conductors of a house-cable with the conductors of cables leading from the junction-box in opposite directions. It will be seen, therefore, that this arrangement of a plurality of connections in the house-connection-boxes and in the cable-division-boxes provides for the usual connection of the subscriber with the telephone exchange and also provides for the connection of one subscriber with another through the junction-boxes.

In order that my invention may be clearly understood, I will refer to the accompanying drawings, in which—

Figure 1$^a$ is a diagrammatic representation of the arrangement for laying and connecting the cables in accordance with my invention. Fig. 1 is a plan view, partly in section, of a cable division box. Figs. 2 and 3 are vertical sections of the same along the lines A—B, and C—D, respectively. Fig. 4 is a detail view of one of the lamellæ of the terminal connections. Fig. 5 is a plan view of a house-connection or distributing junction-box with the cover removed showing the arrangement of terminal sections. Figs. 6 and 7 are vertical sectional views along the lines A—B and C—D, respectively of Fig. 5, and Fig. 8 is a detail cross-section of the cable-securing clamp.

The cable terminal or division boxes which are located at the ends of blocks or districts are shown in Fig. 1$^a$, at $K_1 V_1$ and $K_2 V_2$, each of which are connected by a primary cable with the central exchange. Between the cable terminal or division boxes are located a desired number of multiple-connection or house-distributing junction-boxes $V_1 D_1$, $V_2 D_2$. The cable-division boxes are provided with a terminal connection for each conductor of the primary cable which leads therefrom, and also with two or more additional connections for each conductor located on opposite sides of the terminal connections. By this arrangement, the conductors of the secondary cables connecting the division boxes with the house-distributing junction-boxes, may be connected with the primary cable conductors or either side of the division boxes. These connections also permit one secondary cable to be connected through the division box to another secondary cable, as shown in the upper portion of the division box $K_2 V_2$.

Three pairs of conductors of a house cable are shown as leading into the top of each house-distributing junction-box. By arranging a plurality of connections for each conductor, it will be seen that one pair of conductors may be connected to a secondary cable leading in one direction and another pair of house conductors may be connected to a secondary cable leading in the opposite direction. This arrangement of connections also provides for the through connection of a pair of conductors of a secondary cable with those of another, as shown in the central portion of the junction-box $V_1 D_1$.

The manner of connecting a cable with the junction-box is clearly shown in Fig. 2. The lower portion or base of the junction-box is provided with a conical or funnel-shaped projection which terminates in a tubular sleeve $a$, the lower portion of which is slotted so as to permit the same to be clamped securely about the cable $p$, by the clamping collar $e$.

Above the conical opening in the base plate and at opposite sides thereof are secured brackets $d$, which support a plurality of lamellæ, shown in detail in Fig. 4. These lamellæ are provided with oppositely extending arms $c$ which constitute the terminal connections for the conductors of the cables, and may be pierced to receive the ends of the wires. The lamellæ are also provided with holes for the passage of bolts $d'$ which are secured in the ends supports $d$, the lamellæ being insulated from the bolts in any suitable manner, and from each other by interposed insulating plates. The whole set of lamellæ may be removed from the supports $d$, in order that molten insulating material may be poured around the end of the cable in the sleeve and also in order that the single wires of the cable may be conveniently threaded into the lower arms $c$ of the lamellæ. After the cable has been inserted in the junction-box through the entrance sleeves $a^1$, the individual conductors thereof are separated and are secured, preferably by soldering, to the lower arms $c$ of the lamellæ. A rim or flange $x$ is now passed over the lamellæ and around the supports $d$, and is secured to the base plate in any suitable manner. Insulating material is then poured within the rim until the cable conductors and lower arms of the lamellæ are covered, whereby the hygroscopic paper insulation of the cable is thoroughly protected against moisture which may be in the casing when the lid is removed. In order that the insulating layers between the lamellæ may not be affected by the heat employed in soldering the conductors of the cable to the lamellæ, it is advisable to employ micanite or some other insulating material which is not affected by heat. For the purpose of rendering the case of the junction-box absolutely moisture-proof, the flanges of the base and lid are provided with coöperating grooves $f$, which form a surrounding channel and into which a suitable sealing material may be poured through the holes $g$ connected therewith.

After the box has been made water tight, as above described, the reliability of the packing or sealing of the joints may be tested by removing the small screw $h$ and applying a pressure or vacuum pump. After the test, the screw $h$ is replaced and the channel about the head of the same may be covered with some suitable moisture-proof material. The lid is held fast and securely clamped by means of the bale $i$, pivotally secured to the base portion and carrying the locking bolt $k$, which is adapted to be screwed down upon the lid. The box may be provided with corner lugs L carrying adjusting or leveling bolts $m$, which are supported upon brackets $n$, projecting from the wall of the man-hole, or in any other suitable manner.

The manner of connecting the conductors of the primary cable $p$, with the pairs of conductors of the secondary cables $q$, which connect the cable division-box with the house-distributing boxes is clearly shown in Figs. 1, 2, and 3. The upper and lower arms $c$, of the lamellæ, may be arranged at different angles as shown in Fig. 4. It is convenient to arrange one arm at an angle of about 20° and the other at an angle of about 60° to the vertical axis, so that by alternately reversing the lamellæ horizontally and vertically as they are threaded upon the supporting bolts $d'$, the arms $c$, will be arranged in the star-like manner shown in Fig. 3. The lamellæ which form the connections for the conductors of the secondary cables $q$, are constructed and supported in a manner similar to those of the primary cable and are arranged within the junction-box on either side of the primary cable. Between the central and side sets of lamellæ are supported insulating bars which are provided with holes $o'$ for the passage of the wires connecting the respective lamellæ, as shown in Fig. 3.

The house-distributing or multiple-connection junction-box shown in Figs. 5 to 8, is essentially similar to the above-described cable division box. In this case, however, the two secondary cables $r$, which connect the junction-box with the junction-boxes on either side, enter through the central entrance sleeve $a^2$, which is integral with the base of the box, while the entrance sleeves $a'$ and $a^3$, through which the house connection cables enter, are detachable and secured thereto by bolts $l$, which are operated from the inside of the box in order to avoid the possibility of rusting, inasmuch as they must be unscrewed each time a new subscriber is to be connected. The bolts carrying the lamellæ for the house-connection cables $s$, are mounted upon a support $y$, which is carried by the removable entrance sleeve $a'$ or $a^3$. I have shown the house-distributing junction-box arranged for four house-connection cables. If one of these cables is not needed, the opening in the bottom of the box is closed by means of a dummy lid $z$, and the joint filled with molten asphalt or the like. If it becomes necessary to insert a house-connection cable for the purpose of connecting new subscribers, the dummy lid $z$, is removed and the asphalt plug driven out, so that an entrance sleeve, with its attached lamellæ support, may be inserted. In this case the house-connection cable-end can be inserted in the sleeve $a_1$, and sealed by pouring in suitable material around the cable end and the conductors can be properly secured by soldering to the arms of the lamellæ before these parts have been inserted through the opening in the bottom of the junction-box. Inasmuch as these connections with the cable conductors can be made outside of the junction-box, the rim $x$, around the opening may be made integral with the base of the junction-box and may be filled with insulating material after the sleeve carrying the cable-end and lamellæ support, has been secured in position.

It will be evident that I may combine a cable division-box with one or more multiple-connection boxes and thus reduce the number of multiple-connection or house-distribution boxes required. In this case the intermediate or secondary cables are arranged symmetrically on both sides of the primary cable.

My invention possesses a number of advantages which will be understood from the foregoing description. The junction-boxes described herein provide for the insertion of a cable and the completion of the connections on either side of the boxes and consequently it is never necessary to turn the box around as was frequently the case when employing the devices of the prior art. I have also overcome the necessity for soldering the cable at the entrance to the box and have provided a construction which absolutely excludes the entrance of air or moisture, while arranging for the ready opening or closing of the conductors. Other advantages will be apparent to those skilled in the art.

What I claim and desire to secure by Letters Patent is:

1. A junction-box for electrical conductors, comprising a base portion provided with tubular extensions to receive the cable ends, a cover or lid, means carried by said base arranged to clamp the lid, said base and said lid having flanges each provided with grooves which register to form a closed tubular channel to receive a sealing material, and openings extending through one of said flanges and connecting with said channels.

2. A junction-box for electrical conductors comprising a base having a tubular opening to receive the end of a cable, a series of connecting members arranged in a group and mounted horizontally above said opening, and a marginal flange secured to the base and surrounding said members and projecting above the lower ends thereof.

3. A junction-box for electrical conductors comprising a base having a tubular opening to receive the end of a cable, and a series of connecting members arranged in a group and mounted horizontally above said opening, and each member having a plurality of connecting arms projecting in the same plane and at different angles to the axis thereof.

4. A junction-box for electrical conductors comprising a base having an integral tubular opening, a series of conducting lamellæ insulated from each other and arranged upon a support extending horizontally above said opening, and a marginal flange surrounding the opening.

5. A junction-box for electrical conductors comprising a base having an integral tubular opening, a plurality of flanged openings having detachable tubular portions extending therefrom and insulated connecting-members arranged upon a support extending horizontally above each of said openings having upper and lower connecting arms.

6. A junction-box for electrical conductors, comprising a base having openings to receive the ends of multiple-conductor cables, insulated connecting members mounted above said openings, each member having upper and lower connecting arms, and insulating spacing members between said openings provided with apertures for the passage of conductors joining said connecting members.

7. A junction-box comprising a base having openings to receive the ends of multiple-conductor cables, and a connecting device mounted above each opening having insulated lamellæ mounted upon supporting bars extending horizontally across the opening, each lamella being provided with connecting arms extending at both ends at different angles from the axis thereof.

8. A junction-box comprising a base having openings to receive the ends of multiple-conductor cables, and a connecting device comprising a series of insulated connecting lamellæ arranged in a group, each lamella being provided with upper and lower arms projecting at different angles therefrom respectively, and the series being composed of similar lamellæ arranged upon a horizontal support in alternately reversed horizontal and vertical positions.

In testimony whereof I hereunto affix my signature in the presence of two witnesses.

WILHELM SCHREIBER.

Witnesses:
ABRAHAM SCHLESINGER,
LOUIS MUELLER.